Nov. 5, 1963 J. D. O'REAR Re. 25,474
FOLDABLE AND PORTABLE APPARATUS FOR DELINEATING A PLAYING FIELD FOR GAMES
Original Filed July 5, 1960
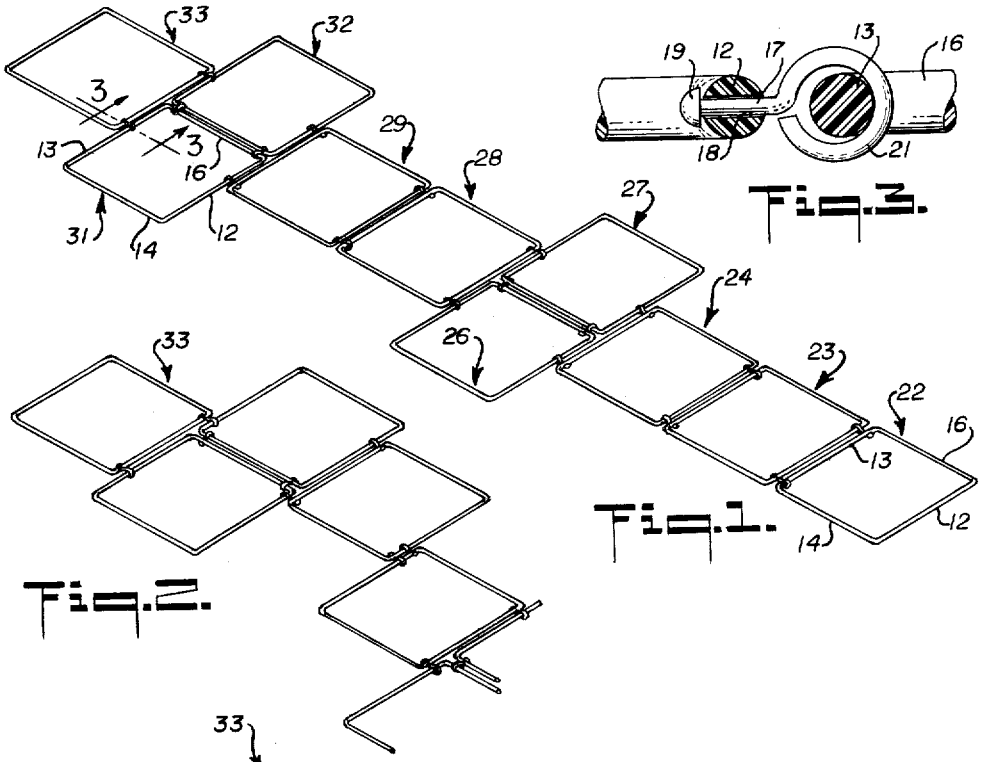
Fig. 1.
Fig. 3.
Fig. 2.
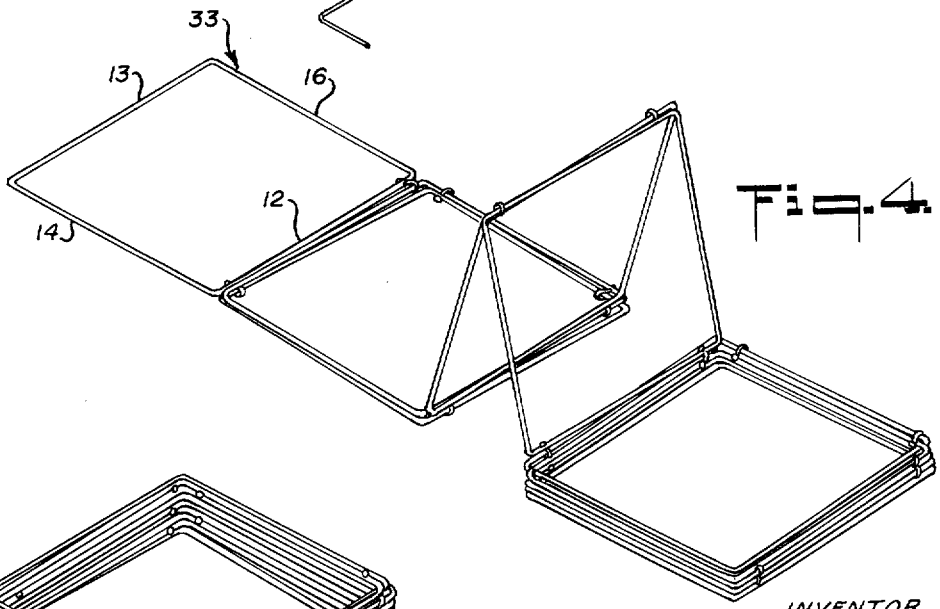
Fig. 4.
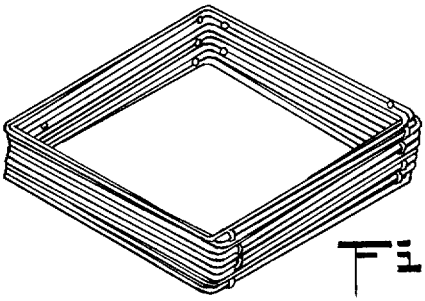
Fig. 5.
INVENTOR
J. D. O'REAR
BY
Gardner & Zimmerman
ATTORNEYS United States Patent Office Re. 25,474
Reissued Nov. 5, 1963

25,474

FOLDABLE AND PORTABLE APPARATUS FOR DELINEATING A PLAYING FIELD FOR GAMES

J. D. O'Rear, Hayward, Calif.

Original No. 3,042,400, dated July 3, 1962, Ser. No. 40,756, July 5, 1960. Application for reissue Sept. 7, 1962, Ser. No. 222,996
Filed Sept. 7, 1962, Ser. No. 222,996
3 Claims. (Cl. 273—1)

Matter enclosed in heavy brackets [ ] appears in the original patent but forms no part of this reissue specification; matter printed in italics indicates the additions made by reissue.

The invention generally relates to games devices which are adapted to be positioned on the ground for playing purposes, and is more particularly directed towards a portable games apparatus for delineating squares or other marginal portions of a game such as hopscotch or the like.

In many instances, it is desirable to provide a portable game device which may be laid on the ground or other supporting surface so as to provide the outline of the playing field. A typical example of such a game is hopscotch in which a plurality of squares are usually drawn on the ground in a particular manner so as to define the limits of play. Frequently it is desirable to have such a game played indoors or on an outdoor grass surface and this presents the problem of either undesirably applying marks to the floor surface, attempting to paint the lines on grass, or otherwise producing the squares in their aforesaid relationship.

It is accordingly an object of the present invention to provide a portable device which may be selectively placed on the ground to delineate a playing field for a game such as hopscotch, and which may be alternately folded into a relatively small compact bundle for carrying or storage.

Another object of the invention is to provide a device of the character described in which the individual boxes or squares of the playing field are individually rigid and rigid relative to adjacent elements so as to provide a generally unitary structure which will remain in proper orientation during play.

A further object of this invention is to provide a device as hereinabove described in which novel means are provided permitting some shifting of the various squares or boxes relative to the adjacent boxes or squares to thereby provide variations in the form of the playing field.

A still further object of the invention is to provide apparatus as hereinabove defined in which novel means are provided permitting free pivotal movement between adjacent boxes or sections for folding between operative and inoperate positions, while at the same time affording structural rigidity between the same.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

FIGURE 1 is a top perspective view of the device of the present invention shown in operative playing position.

FIGURE 2 is a portional view similar to FIGURE 1 but illustrating portions of the device shifted so as to vary the shape of the playing field.

FIGURE 3 is a cross sectional view on an enlarged scale taken substantially in the plane indicated by the line 3—3 of FIGURE 1 and illustrating the method of interconnecting the respective boxes or sections together.

FIGURE 4 is a perspective view of the apparatus as the same is being folded into its inoperative storage condition.

FIGURE 5 is a perspective view with the parts completely folded for storage or transport.

As hereinabove set forth, the present apparatus is adapted to be placed on a floor, carpeting, lawn, or other suitable supporting surface so as to define and provide a playing field for a game such as hopscotch in which a plurality of adjacent boxes or squares are provided and adapted for reception by one or both feet of the player in moving from box to box. In accordance with the present invention, the apparatus is so arranged that it may be unfolded from its inoperative storage position which merely comprises a generally square compact bundle illustrated in FIGURE 5 to an unfolded operative or playing position as shown in FIGURE 1.

Broadly speaking, the apparatus comprises a plurality of squares, sections or boxes, and as here shown such sections are square in form, that is, having four sides of equal length and each side forming a right angle with its adjacent side. For purpose of orientation, the front side of each section being designated 12, the rear side 13, and the opposed longitudinal sides 24 and 16. The sections are preferably formed of rigid material so as to be form retaining, and as illustrated the same are cylindrical in cross section and may be formed such as by bending a metal rod into the form of a square and then welding the abutting end portions together. Conversely, and preferably, the sections are formed of a plastic material so as to be lightweight, form retaining, rust resistant and easy to manage and maintain. As herein illustrated, ten of such sections are provided where the game of hopscotch is to be played and the sections are pivotally interconnected so that the apparatus is a unitary device for ease in operation and storage, while at the same time permitting relative folding and unfolding operations.

Means are provided for pivotally connecting the adjacent sides 12 and 13 of the respective sections together to permit the aforementioned operations, and such means may embrace a variety of forms. However, in view of the fact that a degree of lateral movement is required for certain of the sections the form of pivotal connection illustrated in FIGURE 3 is particularly well adapted for use in the device. As will be noted, the sides 12 or 13 are provided with elements 17 which extend through spaced apertures 18 of such side. The elements 17 are in the form of pins having an enlarged head 19 along the inner surface of the side to prevent withdrawal of the pin through the aperture. The other end of the fastener element is in the form of a loop 21 which embraces the side 12 or 13 of the next section. The fastening members may be formed of a relatively malleable material so that the same may be readily deformed about the sides when the sections are brought into adjacent relationship and after the loop is completed, relative separation of the adjacent sections is effectively prevented. As will be noted in FIGURE 1 of the drawing, the first three sections 22, 23 and 24 are each provided with a pair of such fastening members constructed in accordance with the above description. Thus, the sections 22, 23 and 24, when unfolded, are all in longitudinal alignment with each other. However, the next two sections designated at 26 and 27 are disposed laterally in side by side relation so as to form a generally T-shaped configuration with the elements 22, 23 and 24. In this case, one of the fastening elements 17 of the section 24 is secured by loop 21 to a side 12 of the section 26 while the other fastening element 24 is secured to the front side 12 of element 27. With this arrangement it will be noted that the sections 26 and 27 may be laterally shifted relative to the length or longitudinal axis of the apparatus. Such shifting is best illustrated in FIGURE 2 and by providing the fastening elements substantially immediately adjacent the corners, either one of the sections 26 or 27 may be brought into general alignment with the other sections 22, 23 and 24. When such alignment is effected, the section 26 may be pivoted into lateral overlapping relationship with the element 27 by providing a pair of fastening connectors 17 on the opposed adjacent sides 14 and 16 of the respective sections so as to maintain all of the sections in general alignment for subsequent folding into inoperative position.

Five additional sections 28, 29, 31, 32 and 33 complete the hopscotch apparatus. Section 28 corresponds to section 24 with respect to sections 26 and 27, with its two fasteners secured to one side 13 respectively of the sections 26 and 27, and is likewise pivotally connected to its longitudinally aligned section 29. The sections 31 and 32 correspond to the sections 26 and 27 and are not only pivotally connected to each other about their adjacent edges 14 and 16, but to the sections 29 and 33 in the same manner as the sections 26 and 27 are secured to the sections 24 and 28.

From the foregoing it will be apparent that the device when placed on the ground or supporting surface will provide a proper game field delineator which will be form retaining and which will permit the playing of the game of hopscotch or the like in a conventional manner. However, after the game is completed, the unit may be readily stored and folded into the compact square position illustrated in FIGURE 5. In preparation for such folding the double sections 26, 27 and 31, 32 are first shifted laterally so that the sections 26 and 31 for example are aligned with the remaining sections of the device. The sections 27 and 32 may then be folded over their adjacent section 26 and 31 respectively and then the entire apparatus folded by merely pivoting each section over or under its longitudinally aligned section until the compact bundle illustrated in FIGURE 5 is obtained. To place the device into operative position a mere reversal of the foregoing operation is required.

What is claimed is:

1. Apparatus of the character described comprising a plurality of generally aligned rigid square sections, means on a side of each section adjacent the corners thereof pivotally engaging the adjacent side of an adjacent section whereby said sections may be folded into overlapping aligned relation and unfolded into operative coplanar longitudinally extending relation, a pair of sections adjacent one of said aligned section sides normally disposed in perpendicular relation to the longitudinal extent of said first mentioned sections, means slidably and pivotally connecting said one side with an adjacent side of each of said pair of sections, and means pivotally connecting said pair together for folding about an axis normal to the axes of folding of said first mentioned sections.

2. Apparatus as set forth in claim 1 in which each of said means includes a pin member fixed to a side of one section having a looped section slidably and rotatably engaging a side of an adjacent section.

*3. Apparatus of the character described comprising a plurality of generally aligned rigid square sections, means pivotally connecting the adjacent sides of the respective sections whereby said sections may be selectively folded about said means into overlapping aligned and form retaining relation and unfolded into operative coplanar longitudinally extending and form retaining relation, a pair of adjacent rigid square sections positioned adjacent one side of one of said aligned sections opposite to its pivotal connection to an adjacent section with said pair of sections extending generally perpendicular to the longitudinal extent of said first mentioned sections, and means slidably and pivotally connecting said one side with each of the adjacent aligned sides of said pair of sections whereby said pair of sections may be selectively moved laterally relative to said aligned sections and whereby said pair of sections may be selectively folded into overlapping relation with said one section and unfolded into operative coplanar relationship therewith.*

References Cited in the file of this patent or the original patent

UNITED STATES PATENTS

| | | |
|---|---|---|
| 2,404,097 | Ruppel | July 16, 1946 |
| 2,563,078 | Silberman | Aug. 7, 1951 |
| 2,806,526 | Marcus | Sept. 17, 1957 |
| 2,891,793 | Mudry | June 23, 1959 |
| 2,895,717 | De Falco | July 21, 1959 |